United States Patent [19]
Saimi et al.

[11] Patent Number: 5,640,380
[45] Date of Patent: Jun. 17, 1997

[54] OPTICAL HEAD WITH A TRANSLUCENT PLATE TO SPLIT A LIGHT BEAM

[75] Inventors: Tetsuo Saimi; Yasuo Nishihara; Masatoshi Yajima, all of Osaka, Japan

[73] Assignee: Matsushita Electric Industrial Co., Ltd., Osaka, Japan

[21] Appl. No.: 510,564

[22] Filed: Aug. 2, 1995

[30] Foreign Application Priority Data

Aug. 4, 1994 [JP] Japan .................... 6-183339

[51] Int. Cl.$^6$ .................... G11B 7/125
[52] U.S. Cl. .................... 369/112; 369/103; 369/110
[58] Field of Search .................... 369/112, 110, 369/103

[56] References Cited

U.S. PATENT DOCUMENTS

| | | | |
|---|---|---|---|
| 5,095,476 | 3/1992 | Greve et al. | 369/112 |
| 5,111,448 | 5/1992 | Komma et al. | 369/112 |
| 5,502,707 | 3/1996 | Komma et al. | 369/103 |
| 5,515,354 | 5/1996 | Miyake et al. | 369/112 |
| 5,519,685 | 5/1996 | Kato et al. | 369/110 |

*Primary Examiner*—Georgia Y. Epps
*Assistant Examiner*—Kim-Kwok Chu
*Attorney, Agent, or Firm*—McDermott, Will & Emery

[57] ABSTRACT

Optical-beam 2 emitted from semiconductor laser device 1 is transformed into parallel-light 4 by means of collimator lens 3, and a part of parallel-light 4 passed through parallel glass-plate 7 of which the front-surface is mirror finished and the rear-surface is frost finished is inputted into detector 5 monitoring the light-quantity. The optical-beam reflected from parallel glass-plate 7 is focused on information medium 9 after it passed through a collimator-lens 6. The optical-beam reflected from information medium 9 is then introduced on a detector disposed on the semiconductor laser device taking an reversed course. Since no interference of light transmitted through detector 5 is generated in this optical head, a higher linearity of the output of detector 5 can be obtained so that the better stabilized output control of semiconductor laser device 1 by means of laser control circuit 11 can be obtained.

13 Claims, 2 Drawing Sheets

OPTICAL HEAD WITH A TRANSLUCENT PLATE TO SPLIT A LIGHT BEAM

BACKGROUND OF THE INVENTION

This invention relates to an optical-head for performing reproduction, recording, or erasing of optical information on an optical-medium such as optical disk, and relates more particularly to an optical-head for controlling the quantity of optical beam emitted from an optical-source.

An optical-head employing a beam-splitter as a means to monitor the quantity of optical-beam emitted from an optical source had been conventionally used. A typical example of this is now explained by referring FIG. 4 wherein the optical-beam 102 emitted from the semiconductor laser 101 is introduced into the collimator lens 103, and is transformed into a parallel optical beam which is then introduced into the beam-splitter 104. A part of the optical-beam branched by beam-splitter 104 is introduced into the detector 105 monitoring its light quantity.

The output signal of detector 105 is fed back to the semiconductor laser 101 through the laser control circuit 112 in order to control the quantity of light emitted from semiconductor laser 101 at a proper level.

On the other hand, optical-beam 107 passed through beam-splitter 104 is introduced into the objective-lens 106 after it is reflected by the reflection mirror 108 at nearly right angle, and the optical-beam passed through objective-lens 105 is focused on the information medium 109 by using objective-lens 106.

The focused optical-beam is then reflected by information medium 109, and the reflected optical-beam is introduced into beam-splitter 104 taking a reversed path. The optical-beam reflected by beam-splitter 104 is introduced into the detecting lens 110 and is inputted into signal detector 111 yielding a focus servo-signal, tracking servo-signal and an information signal.

However, since the beam-splitter consists of at least two triangular prisms adhered together, on which anti-reflection layers are deposited, the dimension of beam-splitter is inevitably bulky and the cost is high.

SUMMARY OF THE INVENTION

The optical head of the invention is constructed by employing an optically translucent plate having a poor spatial coherence for preventing the interferences of transmitted light, instead of the conventional beam-splitter.

That is, the invented optical-head comprises an optical-source emitting an optical-beam, an objective lens focusing the optical-beam on an information medium, an optically translucent plate provided with a reflecting layer reflecting a part of the optical-beam disposed between the optical-source and the objective lens, and a detector detecting the optical-beam transmitted through the translucent plate.

However, in this case, the translucent plate is so constructed that the distances between the front-surface and the back-surface of the plate are locally different in order to prevent the interferences of transmitted light.

A preferable mode of the invented optical-head is such that is provided with a light-translucent plate of which front-surface and rear-surface are disposed in nearly parallel macroscopically but the distances between these two surfaces are locally different microscopically. That means that the distance between the front and the rear surface of translucent plate is made microscopically variable by providing a coarser rear-surface roughness than that of the front-surface, which is attained by forming a fine unevenness on the rear-surface.

Another preferable mode of the invented optical-head is such that is provided with a wedge-shaped light-translucent plate of which front-surface and rear-surface are combined at a constant slant angle, and still another mode of the invented optical-head is such employing a light-translucent plate having a flat front-surface and a convex rear-surface.

Since a light-translucent plate of very simple structure can be employed instead of the conventional beam-splitter of complicated structure, the optical-head of the invention can be manufactured at a considerably lower cost and the size of it can be considerably smaller.

When a flat translucent plate where the front- and rear-surfaces are disposed in parallel and having a nonreflective coating deposited on the rear-surface is employed, precise control of semiconductor laser output can hardly be obtained because of the inevitable variations of detected light quantity caused by the interferences of transmitted light.

However, the interference of transmitted light can be nullified by scattering the transmitted light and by varying the light path by employing the invented optical-head incorporating a light translucent plate of which distance between the front and the rear surfaces is locally different, so that the output of semiconductor laser can be controlled precisely.

DESCRIPTION OF THE PREFERRED EMBODIMENT

Figure 1:
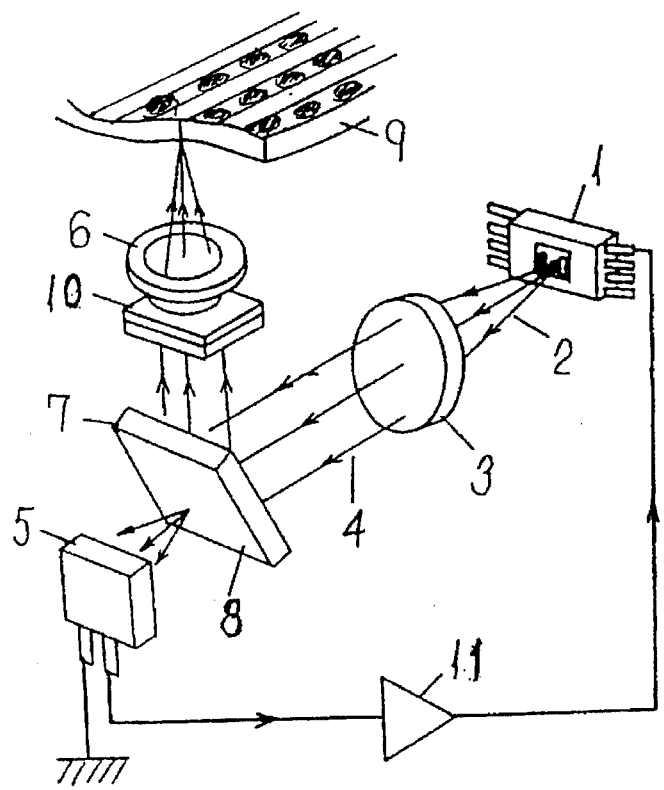
FIG. 1 shows a schematic drawing of the invented optical-head.
Figure 2:
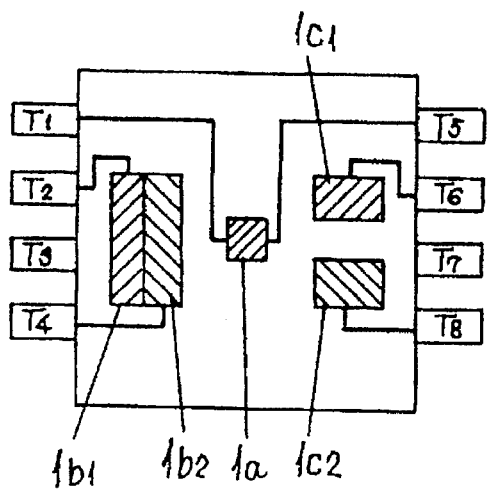
FIG. 2 shows a schematic drawing of the semiconductor laser device incorporated in the optical-head of the invention.

A preferred embodiment of the invented optical-head is now explained below by referring FIGS. 1, 2 and 3.

The optical-beam 2 emitted from the light-emitting region 1a (shown in FIG. 2) of semiconductor laser device 1 is transformed into a nearly parallel optical-beam 4 as it is passed through the collimator-lens 3. This parallel optical-beam 4 is introduced onto a glass-plate 7 provided with parallel front- and rear-surfaces, and a part of the optical-beam 4 passed through glass-plate 7 is inputted into detector 5 of the light quantity monitor.

In this case, since a reflective layer (having a surface reflectance of 80%, and a transmittance of 20%) allowing a partial transmission of optical-beam 7 is deposited on the front-surface of glass plate 7, the front-surface acts a mirror surface substantially. A fine irregularity is provided on the rear surface 8 of glass-plate 7 which is frost finished by using an abrasive of grit size of #3000 ceria. Since the output of detector 5 is fed back to the semiconductor laser device 1 through the laser control-circuit 11, the quantity of light emitted therefrom is maintained at a constant level.

On the other hand, the optical-beam reflected and bent in a right-angle at the surface of glass plate 7 is passed through the objective lens 6 and is focused on the information medium 9. Taking an exactly reversed path, the reflected light is then introduced on hologram 10 where the reflected light is refracted.

The refracted optical-beam is then reflected by the glass plate 7, and is introduced in collimator lens 3 and is inputted on the detectors 1b1, 1b2, 1c1, and 1c2 (shown in FIG. 2) yielding information signals, tracking servo-signals, and focus servo-signals.

The optical-beam reflected from information-medium 9 is then splitted into positive and negative primary optical beams by hologram 10, and one of the splitted optical beam is introduced on the detectors 1b1 and 1b2 while the other is introduced on the detectors 1c1 and 1c2. The sum signal of detectors 1b1, 1b2, 1c1, and 1c2 is utilized to read the information signal, while the difference signal is utilized to detect both the focusing error and the tracking error. The input and output of signals to the detectors 1b1, 1b2, 1c1, and 1c2 are conducted through the terminals T1, T2, T3, T4, T5, T6, T7, and T8.

Figure 3:
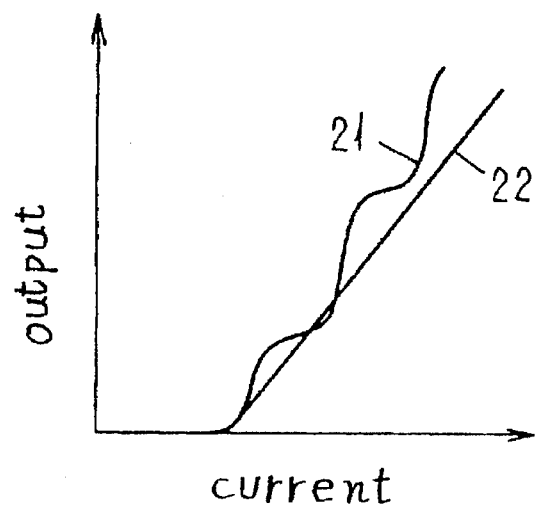
FIG. 3 shows a relationship between the current supplied to the semiconductor laser light-emitting diode and the output current of the detector monitoring the light quantity of semiconductor laser device incorporated in the optical-head of the invention.
Figure 4:
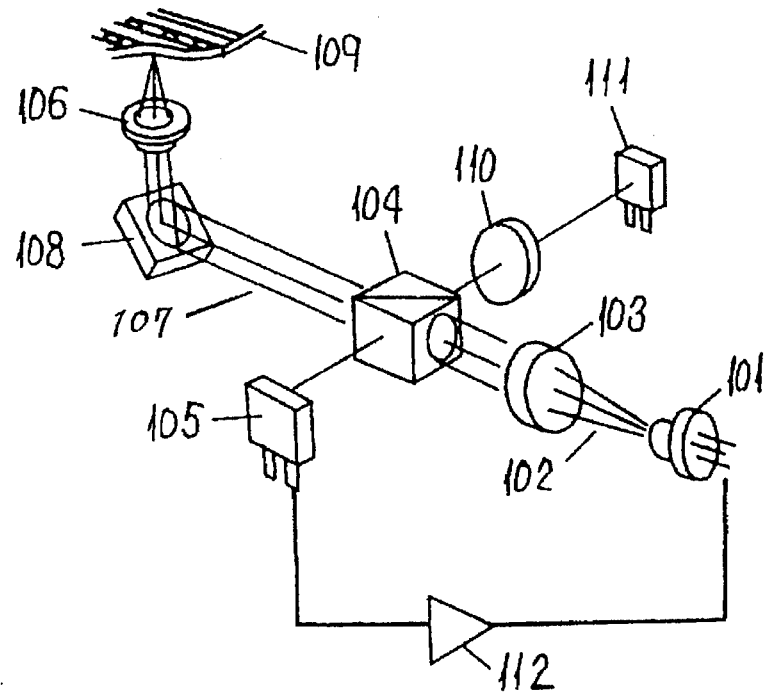
FIG. 4 shows a schematic drawing of the conventional optical-head.

FIG. 3 shows a relationship between the current in the light emitting region 1a of semiconductor laser device 1 and the output current of detector 5 monitoring the light-quantity of optical beam. However, the measured relationship of invented optical-head employing a translucent glass plate 7 of which rear-surface 8 is finished by a grit of #3000 ceria is expressed by the output waveform 22. The waveform 21 is a characteristics shown for a comparison, and is obtained by using a flat glass-plate (having a rear-surface reflectance of 0.5%). In this case, a nonreflectance coating layer is deposited on its rear-surface instead of the frost-finished glass plate 7.

When the injection current of semiconductor laser device 1 is increased in order to increase the output power, the wavelength of laser light is tend to be shifted toward longer. Due to this shift of wavelength, a sin-curved winding linked to the variation of waveform period is produced in output-waveform 21 obtained when a nonreflectance coating is deposited on the rear-surface. On the other hand, no winding is seen in output-waveform 22 obtained by providing coarse rear-surface, attaining a very good linearity.

Therefore, when an optical-head employing flat-glass 7 of which rear-surface is coarse finished, the light-quantity of optical-beam passed through the objective lens can be precisely controlled by amplifying the output of detector 5 and by controlling the current going through the light-emitting region 1a.

When an optical-beam is introduced on a glass-plate, the interference of optical-beams reflected between the rear and the front surfaces can be a problem. Even if a glass-plate of which reflectance of rear-surface is suppressed at a level less than 0.5% by depositing a nonreflecting coating, the interference is possible. As a result of this, a large variation of transmitted light-quantity as high as 2.5 times between the highest and the lowest takes place.

With an optical system using a semiconductor laser, a shift of interference fringes is possible by the changes of wavelength, temperature and other factors of the laser device, and by this, a variation of light-quantity inputted to the detector monitoring the light-quantity is possible also. As a result of this, proved by output-waveform 21 shown in FIG. 3, the exact control of optical-beam inputted onto the information medium becomes impossible.

In order to suppress the light-quantity changes at a level less than 5%, the reflectance of rear-surface has to be reduced at a level less 0.006%. Since this is essentially equivalent to 0%, the realization of this should be actually impossible.

On the other hand, as shown in the above embodiment, when the rear-surface of glass-plate is roughened, the phase of wave-front of optical beam is randomized so that no interference can takes place. This means that the effects of interference due to the wavelength and the light-path length changes become negligible as the interference fringes generated between the rear and the front surfaces becomes finer.

Therefore, the possible shift of interference fringes due to the wavelength change caused by the changes of laser-power and temperature can be suppressed, and by this, the variations of output of detector monitoring the light-quantity can be nullified so that the light-quantity of optical-beam passing through the objective lens can be controlled precisely.

With a glass-plate of which rear-surface is roughened, no spatial coherence of optical-beam would be lost when the roughness of the rear-surface is made excessiblely fine. Thus, the roughness of rear-surface should be so determined that the light-path difference of more than a half-wavelength of optical-beam is produced between the front and the rear surfaces in order to lose the spatial coherence of optical-beam. For example, when a semiconductor laser generating a laser-light of a wavelength of 790 nm is employed, the rear-surface should be roughened preferably producing a light-path difference of more than 395 nm.

On the other hand, the transmittance of glass plate would be lower if the roughness of rear-surface is made too high. Thus, the precise detection of optical-beam using a light-quantity monitor becomes impossible by using a glass plate having a too low transmittance. At that time, the detector output signal is too low also so that the precise control of semiconductor laser output becomes impossible.

According to an experimental result, when a glass plate of which rear-surface is roughened by using an abrasive of grit size of #3000 ceria, an adequate output of about 80% over the output attainable when a glass-plate on which a nonreflectance layer is deposited. Moreover, an output of 60 to 70% over the same is obtained when the rear-surface is roughened by using an abrasive of grit size of #800 ceria, and this is considered adequate also.

Therefore, the rear-surface should be roughened preferably by using an abrasive of grit size of #800 ceria or finer. Since the surface finish using an abrasive of more than #4000 ceria should be conducted under a high-degree processing technique, this could be a problem in terms of the productivity and production cost. Thus, the rear-surface should preferably be roughened by using an abrasive of grit size of #4000 ceria or higher.

The reflectance of reflecting layer deposited on the front-surface of glass-plate should preferably be within 70% to 95% in a case when the optical-head has to deal with a horizontally polarized optical-beam. If a reflecting layer having a reflectance less than 70% is used, a major part of the light-quantity of optical-beam reached to the information medium is lost and the readout operation of information signal becomes unstable.

On the other hand, when a reflecting layer having a reflectance of more than 95% is used, the light-quantity introduced on the light-quantity monitoring detector is so decreased that the accuracy of light quantity detection is decreased, resulting in the difficulty of stable control of semiconductor laser output.

Furthermore, when an optical-head utilizing an optical beams polarized vertically introduced onto the glass plate, the reflectance of reflecting layer should preferably be within 70% to 95% for the vertically polarized optical beam, and should preferably be 90% or more for the horizontally polarized optical-beam. In this case of optical head, the more effective use of optical beam is possible by making the reflectance to the horizontally polarized optical beam larger than that for the vertically polarized optical beam.

An embodiment of the invention using a glass-plate of which rear-surface is roughened has been shown so far, objects randomly changing the optical-phase by causing changes of microscopic light-path length, such as micro-bead having a different refractive index, may be introduced within the glass-plate instead.

A few more embodiments of the invention using glass-plates different from the above-mentioned glass-plate are now explained below.

An embodiment of these is obtained by an optical-head using a wedge-shaped glass-plate of which thickness between the front and the rear surfaces is continuously changed. Since the distance between the front and the rear surfaces is continuously changed, a partial interference may takes place at any wavelength, but the generation of concentrated inference at a specific wavelength can be prevented. Therefore, a periodic nonlinearity such as output waveform 21 shown in FIG. 3 can hardly takes place. Although the cost of wedge-shaped glass plate is slightly higher, the effect nearly same as the one available by the above-mentioned glass plate can be obtained.

Another optical-head is the one using a glass-plate having a flat front-surface and a convex rear-surface. Since the distance between the front and the rear surfaces are continuously changed in this case also, the generation of concentrated interference at a specific wavelength can be prevented also. Since the glass-plate has a structure of convex lens, the transmitted light is focused on the light-quantity monitoring detector so that the accuracy of detection is increased. Furthermore, the same effect can be obtained also by providing a hologram-lens in place of the convex rear-surface.

The present invention is not necessarily be limited within the range of above-shown embodiments of the invention, but needless to say, a number of variations of these are possible. For example, collimator-lens 3 is not an essential structural component. Although the collimator-lens 3 is a very effective means to improve the accuracy of optical-spot on the information medium such as a case of information recording device, collimator-lens 3 can be omitted when no optical spot accuracy is required such as a case of device dedicated to reproduction where a considerable aberration is allowable and a recording device requires no high accuracy of optical spot.

In this embodiment of the invention, an optical-head using semiconductor laser device 1 to which various detectors 1b1, 1b2, 1c1, and 1c2 are incorporated and the light-emitting region 1a integrated with the optical-source has been shown. Since the optical-head is integrated with the optical-source and the light quantity detector, this is highly effective to construct the optical-head into a compact form.

However, the present invention is not necessarily be limited within a scope of this device integrated with the semiconductor laser device, but is applicable to the one where the optical source and the detector are independently provided. Moreover, the optical source is not necessarily be limited within a scope of semiconductor laser device, but is applicable to the gas-laser, solid-state laser, and other optical-sources. Therefore, the spirit of the present invention and the variations within the scope of the invention shall be included within the claims of the invention.

What is claimed is:

1. An optical-head comprising;
   an optical-source emitting an optical-beam;
   an objective-lens focusing said optical-beam on an information medium;
   a translucent plate disposed between said optical-source and objective-lens, wherein a reflecting layer allowing a partial transmission of said optical-beam is disposed on the front surface of said translucent plate which faces the information medium so that the optical-beam is reflected to the information medium; and
   a detector detecting said partial optical-beam transmitted through said translucent plate;
   wherein a distance between the front-surface and the rear-surface of said translucent plate is locally different so as to prevent interferences of the transmitted partial optical-beam.

2. An optical-head according to claim 1; wherein the front-surface and the rear-surface of said translucent plate are disposed in parallel macroscopically and the distance between these two surfaces are different microscopically.

3. An optical-head according to claim 1; wherein roughness of the rear-surface of said translucent plate is coarser than that of the front-surface.

4. An optical-head according to claim 1; wherein the rear-surface of said translucent plate is frost-finished.

5. An optical-head according to claim 1; wherein the rear-surface of said translucent plate is finished by using an abrasive of which grit sizes are between #800 to #4000.

6. An optical-head according to claim 1; wherein said reflecting-layer has a reflectance of 70–95% to an optical-beam horizontally polarized to the front-surface of said translucent plate.

7. An optical-head according to claim 1; wherein said reflecting layer has a reflectance of 70–95% to an optical beam vertically polarized, and has a reflectance of 90% or more to an optical-beam horizontally polarized to the front-surface of said translucent plate.

8. An optical-head according to claim 1; wherein said translucent plate is a wedged-shaped plate of which front-surface and rear-surface are combined at a slant angle.

9. An optical-head according to claim 1; wherein the front-surface of said translucent plate is flat and the rear-surface of said translucent plate is convex.

10. An optical-head according to claim 1; wherein a collimator-lens transforming the optical-beam emitted from said optical-source into a parallel-light is disposed between said optical-source and said translucent plate.

11. An optical-head according to claim 1; wherein said optical-source comprises a semiconductor laser device integrated with a detector detecting a light reflected from said information medium.

12. An optical-head comprising:
    an optical-source emitting an optical-beam;
    an objective-lens focusing said optical-beam on an information medium;
    a translucent-plate disposed between said optical-source and objective-lens, provided with a reflecting layer on the front surface of said translucent plate reflecting said optical-beam at a nearly right angle and allowing a partial transmission of said optical-beam, said optical-beam is disposed on the front surface of said translucent plate which faces the information medium so that the optical-beam is reflected to the information medium; and
    a detector detecting said partial optical-beam transmitted through said translucent-plate;

wherein the front-surface and the rear-surface of said translucent plate are disposed in parallel and surface roughness of the rear-surface is coarser than that of the front surface.

13. An optical-head according to claim 12; wherein said reflecting-layer has a reflectance of 70 to 95% to an optical-beam polarized vertically to the front-surface of said translucent plate and has a reflectance of 90% or more to an optical-beam polarized horizontally to the front-surface of said translucent plate.

* * * * *